United States Patent [19]

Gagliardi, Jr.

[11] Patent Number: 5,232,397
[45] Date of Patent: Aug. 3, 1993

[54] METHOD OF MAKING A FOOD PRODUCT FROM THE WING OF A BIRD AND FOOD PRODUCT MADE IN ACCORDANCE WITH THE METHOD

[75] Inventor: Eugene D. Gagliardi, Jr., West Chester, Pa.

[73] Assignee: Designer Foods, Inc., Wilmington, Del.

[21] Appl. No.: 916,291

[22] Filed: Jul. 17, 1992

[51] Int. Cl.⁵ ............................................. A22C 21/00
[52] U.S. Cl. .................................. 452/169; 452/170; 452/135; 426/644
[58] Field of Search ............... 452/169, 166, 170, 174, 452/149, 135, 136; 426/644

[56] References Cited

U.S. PATENT DOCUMENTS

| | | | |
|---|---|---|---|
| 2,992,924 | 7/1961 | Kelly | 452/138 |
| 4,207,653 | 6/1980 | Gasbarro | 452/169 |
| 4,769,872 | 9/1988 | Hazenbroek et al. | 452/169 |

FOREIGN PATENT DOCUMENTS 8302495  2/1985  Netherlands ...................... 452/169

*Primary Examiner*—Willis Little
*Attorney, Agent, or Firm*—Panitch Schwarze Jacobs & Nadel

[57] ABSTRACT

A method of making a food product from a wing of a bird is disclosed. The wing includes a middle section, a tip section connected to one end of the middle section, and an end section attached to the other end of the middle section. The food product is produced by cutting the bird wing in order to separate the middle section from the tip and end sections. The separated middle section is cut along a first cut line to remove the first knuckle from the separated middle section. The separated middle section is also cut along a second cut line to remove the second knuckle from the separated middle section. When the food product is cooked, the meat shrinks inwardly to expose end portions of bones within the middle section. The present invention also encompasses the food product which results from the process of the present invention.

20 Claims, 2 Drawing Sheets

METHOD OF MAKING A FOOD PRODUCT FROM THE WING OF A BIRD AND FOOD PRODUCT MADE IN ACCORDANCE WITH THE METHOD

BACKGROUND OF THE INVENTION

The present invention generally relates to a method of making a food product from the wing of a bird as well as the food product produced thereby, and, more particularly to a food product comprising an elongated strip of wing meat surrounding and attached to two generally elongated bones spaced generally parallel to each other.

Birds, such as poultry and fowl, are conventionally eviscerated, dressed, and sold either as a whole bird or as severed parts, i.e., breast, thighs, wings, etc. One of the parts which is sometimes separated and sold is the bird wing, which comprises a middle section, a tip section attached to one end of the middle section and an end section attached to the other end of the middle section. FIG. 1 shows a typical bird wing 102, wherein the tip section 114 and the end section 116 have been separated from the middle section 104. As is conventionally known, bird wings are not as commercially valuable as other parts of birds, such as breasts, thighs, and legs, due to the relatively small amount of meat in the wing, the size and centralized location of the bones and joints, and the high percentage of skin, bone and joints to meat.

In recent years, there has been an increasing demand for innovative meat products, particularly meat products which require less time for preparation and which include little or no waste. There has also been an increasing demand for meat products which are boneless or relatively boneless, making such products easier to consume. Hence, products such as boneless chicken breast, chicken tenders, etc., have enjoyed tremendous commercial success and have obtained enhanced popularity for the respective cuts from which they are prepared.

Until recently, bird wings have not been particularly amenable to such enhanced commercial processing and/or preparation methods for a variety of reasons primarily related to the relatively small amount of meat, the size and centralized location of the bones, etc.

The present invention comprises a method of making a unique food product from the middle section of a bird wing. The food product comprises an elongated strip of wing meat surrounding and attached to two generally elongated bones spaced generally parallel to each other. When the food product is cooked, the meat surrounding and attached to the two bones shrinks inwardly along the bones thereby exposing end portions of the two bones. The exposed end portions represent convenient "handles" which consumers can grasp while eating the cooked food product. Therefore, the food product of the present invention is easy to consume as "finger food" and is particularly well adapted for serving as hors d'oeuvres at parties. The present invention also includes the food product (both cooked and uncooked) which is produced by the present method.

SUMMARY OF THE INVENTION

Briefly stated, the present invention comprises a method of making a food product from a wing of a bird, wherein the wing comprises a middle section having a first knuckle, a second knuckle spaced from the first knuckle, two bones spaced generally parallel to each other and extending between and being connected to the first and second knuckles and meat surrounding and attached to the two bones. The middle section also includes an axis extending generally parallel to the two bones. The wing further includes a tip section attached to the first knuckle and an end section attached to the second knuckle. The method includes the steps of cutting the wing to separate the middle section from the tip and end sections. The separated middle section is cut along a first cut line extending generally perpendicular to the axis, wherein the first cut line is spaced from the first knuckle by a first predetermined distance so as to remove the first knuckle from the separated middle section. The separated middle section is also cut along a second cut line which also extends generally perpendicular to the axis, wherein the second cut line is spaced from the second knuckle by a second predetermined distance in order to remove the second knuckle from the separated middle section.

After the first knuckle and the second knuckle are removed from the middle section, the middle section may be cooked. Cooking of the middle section causes the meat surrounding the two bones to shrink such that end portions of the two bones are exposed.

BRIEF DESCRIPTION OF THE DRAWINGS

The foregoing summary, as well as the following detailed description, is better understood when read in conjunction with the appended drawings. For the purpose of illustrating the invention, an embodiment which is presently preferred is shown in the drawings. It is understood, however, that this invention is not limited to the precise arrangements and instrumentalities shown. In the drawings.

DETAILED DESCRIPTION OF PREFERRED EMBODIMENTS

Figure 1:
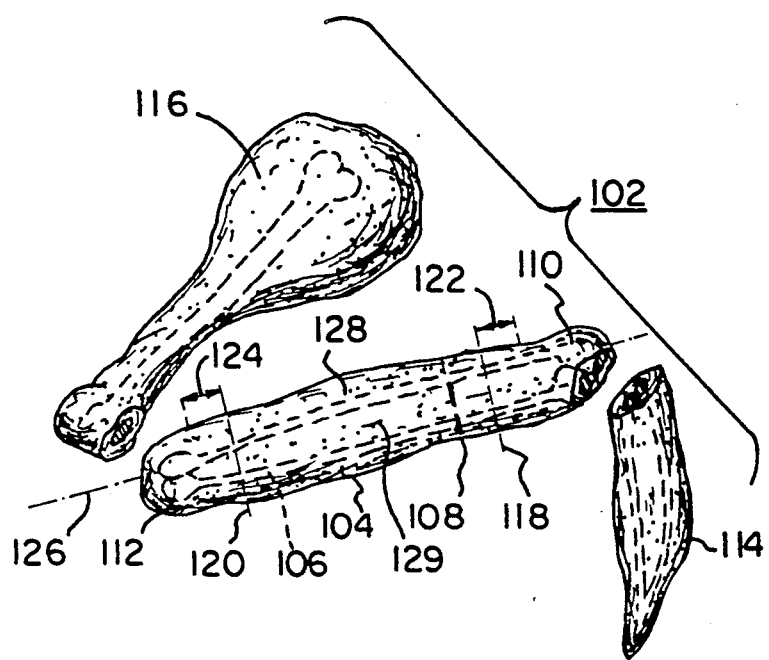
FIG. 1 is an elevation view of a bird wing wherein the tip section and the end section of the bird wing have been separated from the middle section of the bird wing.

Referring in detail to the drawings, wherein like numerals indicate like elements throughout, there is shown in FIG. 1 an elevation view of a bird wing 102 which has been separated from a bird. The bird wing 102 shown in FIG. 1 can be from any type of fowl or poultry carcass, and therefore the present method is equally applicable to all types of fowl or poultry carcasses including ducks, turkey, squab, chicken, etc., both wild and domesticated.

The chicken wing 102 includes a middle section 104 having a first joint or knuckle 110 proximate one end, a second joint or knuckle 112 spaced from the first knuckle 110 proximate the other end, and two generally elongated bones 106 and 108 spaced generally parallel to each other and extending between and being connected to the first and second knuckles 110 and 112. The middle section 104 further includes meat 128 which surrounds and is attached to the two bones 106 and 108 and is generally held in place by a layer of skin 129. The middle section 104 further includes an axis 126 which extends generally parallel to the two bones 106 and 108.

The bird wing 102 also includes a tip section 114 and an end section 116. Although not shown as such in FIG. 1, the tip section 114 is naturally attached to the first knuckle 110 of the middle section 104 and the end section 116 is naturally attached to the second knuckle 112 of the middle section 104. The method of the present invention is described below under the assumption that the tip section 114 and the end section 116 are still attached to the middle section 104.

The method of the present invention for making a food product from a wing of a bird shall now be described with reference to the bird wing 102 shown in FIG. 1. First, the bird wing 102 is cut to separate the middle section 104 from the tip section 114 and from the end section 116 (as shown in FIG. 1). Specifically, the bird wing 102 is cut proximate or through the first and second knuckles 110 and 112 such that at least a substantial portion of the first and second knuckles 110 and 112 remain attached to the middle section 104. Such cuts to the bird wing 102 proximate or through the first and second knuckles 110 and 112 can be made by first locating the first and second knuckles 110 and 112 by touch or by any other well-known technique. Additionally, the bird wing 102 can be cut to separate the middle section 104 from the tip section 114 and the end section 116 using any suitable cutting implement or instrumentality, such as a cleaver, a meat knife, a power meat saw, a water knife, a laser, etc.

The separated tip section 114 and separated end section 116 can be further packaged, prepared, and sold separately. For example, the separated end section 116 can be prepared, packaged, and separately sold as "Buffalo Wings", "Hot Wings", etc. It is well known that such food products are highly desired by consumers and, correspondingly, have a relatively high per pound value. Thus, the present invention enhances the desirability and profitability of the entire bird wing 102, not just the middle section 104.

After the middle section 104 has been separated from the tip section 114 and the end section 116, the separated middle section 104 is cut along a first cut line 118 (see FIGS. 1 and 2) extending generally perpendicular to the axis 126 of the bird wing 104. The first cut line 118 is spaced from the first knuckle 110 toward the second knuckle 112 by a first predetermined distance 122. The cut made to the separated middle section 104 along the first cut line 118 extends entirely through the middle section 104 such that the first knuckle 110 is completely separated from the separated middle section 104.

The separated middle section 104 is also cut along a second cut line 120. The second cut line 120 extends generally perpendicular to the axis 126 of the middle section 104, and is spaced a second predetermined distance 124 from the second knuckle 112 toward the first knuckle 110. The cut made to the middle section 104 along the second cut line 120 also extends entirely through the middle section 104 such that the second knuckle 112 is completely separated from the separated middle section 104.

Preferably, the first predetermined distance 122 and the second predetermined distance 124 are both substantially equal to a value which spaces the first cut line 118 slightly beyond the extremity of the first knuckle 110 toward the second knuckle 112 and which spaces the second cut line 120 slightly beyond the extremity of the second knuckle 112 toward the first knuckle 110. As those skilled in the art will appreciate, the specific value of the first predetermined distance 122 and the second predetermined distance 124 may vary depending on the particular size and shape of the particular bird wing 102. In order to position the first and second cut lines 118 and 120 in conformance with the first and second predetermined distances 122 and 124, respectively, the boundaries of the first and second knuckles 110 and 112 must be determined. Such determination is accomplished by feel or any other well-known technique.

Figure 2:
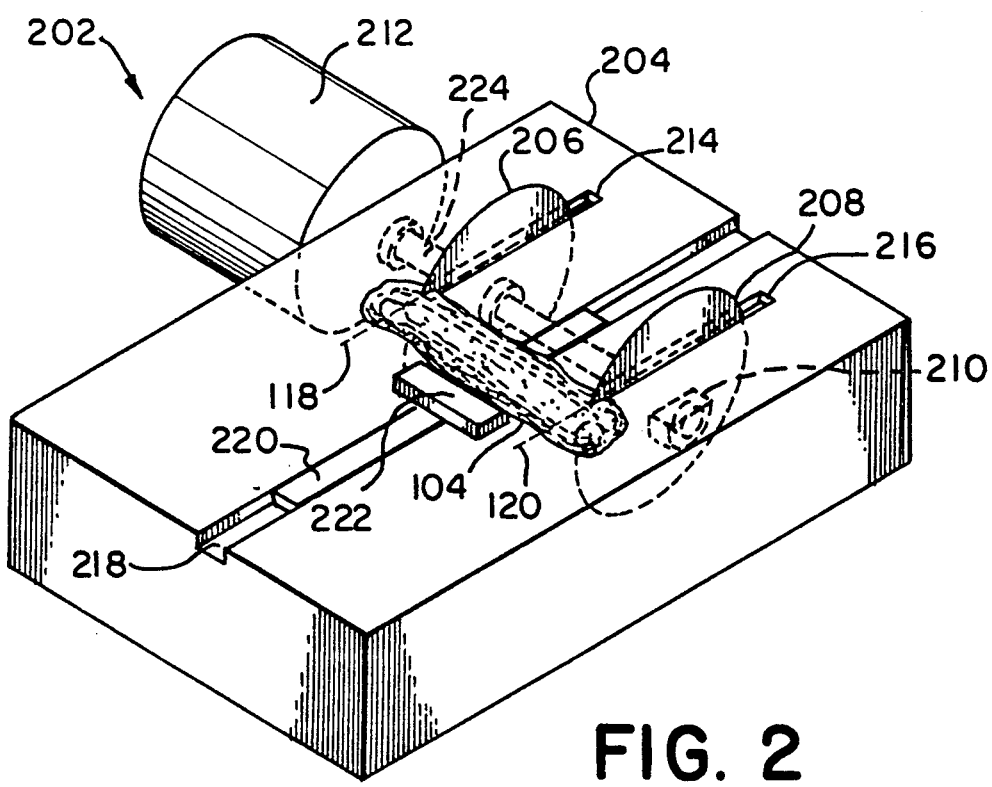
FIG. 2 is a perspective view of a cutting apparatus employed in separating the first and second knuckles of the middle section of the bird wing from the remainder of the middle section.

Preferably, the present method is performed by first cutting the bird wing 102 to separate the tip section 114 and the end section 116 from the middle section 104. Then, the separated middle section 104 is cut along the first and second cut lines 118 and 120 to remove the first and second knuckles 110 and 112 from the separated middle section 104. The cuts to the separated middle section 104 along the first and second cut lines 118 and 120 can be made in either order or can be made simultaneously. FIG. 2 is a perspective view of a cutting apparatus or device 202 for simultaneously making the cuts to the separated middle section 104 along the first and second cut lines 118 and 120. While any suitable meat cutting implement or instrumentality can be used to make the cuts to the separated middle section 10 along the first and second cut lines 118 and 120, such as a meat knife, a cleaver, a meat saw, a water knife, a laser, etc., the cutting apparatus 202 shown in FIG. 2 is preferably used.

The cutting apparatus 202 includes a pair of disk-like, generally parallel spaced cutting blades 206 and 208, each of which is secured to a generally cylindrical shaft 224. Preferably, the cutting blades 206 and 208 are made of stainless steel or some other high strength material suitable for the cutting and preparation of food.

A rotating drive member, in the present embodiment an electric powered motor 212, is secured to one end of the shaft 224. The other end of the shaft 224 is rotatably mounted in a bushing 210. Providing electrical power to the motor 212 results in rotation of the shaft 224. Rotation of the shaft 224 results in corresponding and simultaneous rotation of the cutting blades 206 and 208. Simultaneous rotation of the cutting blades 206 and 208 results in simultaneous cutting of the separated middle section 104 along the first and second cut lines 118 and 120, thereby separating the first and second knuckles 110 and 112 from the separated middle section 104. It will be appreciated by those skilled in the art that the above-described mechanical drive system, while presently preferred, is but one example of a means for causing rotation o the cutting blades 206 and 208. Other drive systems, such as a pulley drive system and a gear drive system, may alternatively be employed. Likewise, a differently powered drive member, such as a steam or gas powered motor, could be employed if desired. It should also be understood that some other type of cutting means other than blades 206 and 208 could be used if desired.

A conveyor apparatus is preferably employed for moving the separated middle section 104 toward the rotating cutting blades 206 and 208. The conveyor apparatus includes a moving member 220 which slides inside a groove 218 formed in a working block 204 of the cutting apparatus 202. A retaining member 222 is attached to the moving member 220. The retaining member 222 engages the separated middle section 104, thereby pushing the separated middle section 104 toward the rotating cutting blades 206 and 208. The moving member 220 preferably moves inside the groove 218 under the power of the motor 212. Alternately, the moving member 220 may move inside the groove 218 under the power of a motor separate from the motor 212, or under manual power and control.

Note that the cutting blades 206 and 208 are partially enclosed in the working block 204 through slits 214 and 216, respectively. Although not particularly shown in FIG. 2, the blades 206 and 208 are removably and adjustably secured to the shaft 224 (utilizing, for example, a bushing and threaded pin arrangement) and the slits 214 and 216 are sufficiently wide to allow the distance between the cutting blades 206 and 208 to be adjusted in order to accommodate particular middle sections 104 of varying types and sizes.

Figure 3:
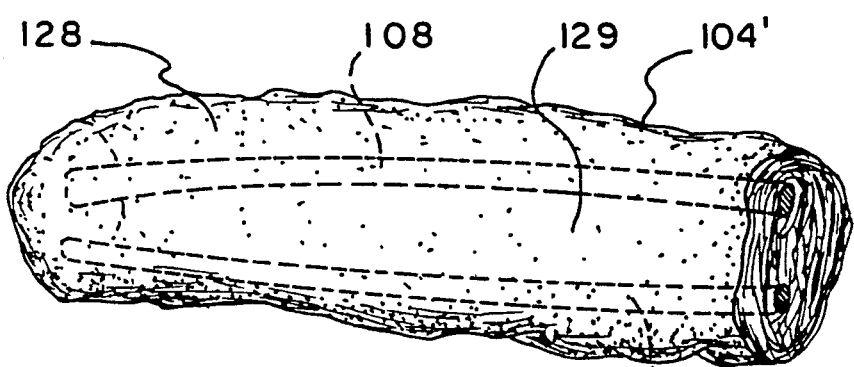
FIG. 3 is an elevation view of the middle section of a bird wing wherein the first and second knuckles have been removed.

FIG. 3 is an elevation view of an uncooked food product 104' which is the result of the process of the present invention. The uncooked food product 104' represents the middle section 104 of the bird wing 102 after the tip section 114, the end section 116, the first knuckle 110, and the second knuckle 112 have been removed. As evident from FIG. 3, the uncooked food product 104' includes meat 128 from a bird wing 102, wherein the meat 12 surrounds and is attached to two generally elongated bones 106 and 108 which are spaced generally parallel to each other and a layer of skin 129. The present invention also encompasses the uncooked food product 104' produced by the process of the present invention.

Figure 4:
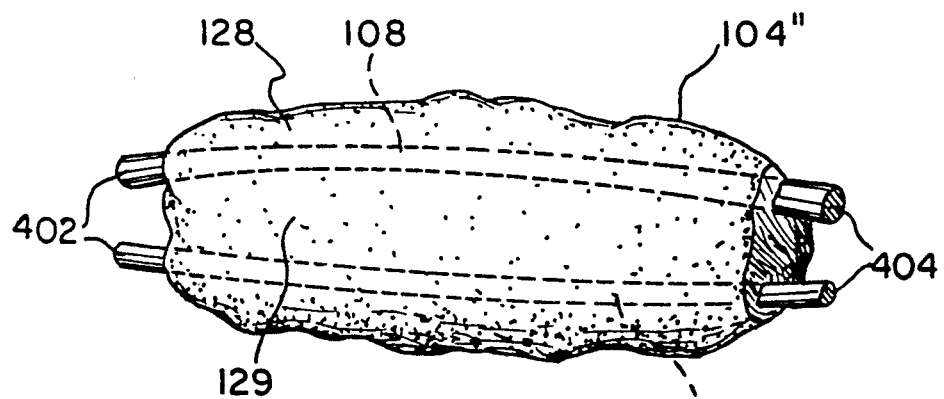
FIG. 4 is an elevation view of the middle section of FIG. 3 after cooking.

The process of the present invention also includes the step of cooking the uncooked food product 104'. The cooking step encompasses all well-known techniques for cooking, including grilling, baking, frying, boiling, etc. The food product 104' may be cooked as shown or the skin 129 may be removed prior to cooking. Cooking of the uncooked food product 104' causes the meat 128 surrounding and attached to the two bones 106 and 108 to shrink axially inwardly away from the ends, thereby exposing end portions of the two bones 106 and 108. FIG. 4 is an elevation view of a cooked food product 104" which is the result of the process of the present invention, wherein the exposed end portions of the two bones 106 and 108 are denoted by 402 and 404. The cooked food product 104" represents the uncooked food product 104' after the uncooked food product 104' has been cooked. As shown in FIG. 4, the two bones 106 and 108 extend through the entire length of the meat 108, thereby providing structural stability to the meat 108 and facilitating consumption of the cooked food product 104". In fact, the two bones 106 and 108 represent convenient handles for facilitating consumption of the cooked food product 104". Since the handles are "built-into" the uncooked food product 104', the uncooked food product 104, is easy to prepare. Consumers can grasp the exposed end portions 402 and 404 of the two bones 106 and 108 (similar to grasping the ends of toothpicks which have been inserted through appetizers or "finger food") while consuming the cooked food product 104". For example, consumers can grasp the exposed end portions 402 and 404 of the two bones 106 and 108 to hold the cooked food product 104" while eating the meat 128 around the two bones 106 and 108 (note that eating the meat 128 around the two bones 106 and 108 is facilitated because the first and second knuckles 110 and 112 have been removed so there is no gristle, cartilage, etc. to contend with) or to pull one or both of the two bones 106 and 108 from the meat 128 in preparation to eating the meat 128. Thus, the cooked food product 104" generated by the process of the present invention is easy to prepare and consume.

As described above, four separate cuts are preferably made to the bird wing 102 in order to (1) separate the tip section 114 from the middle section 104, (2) separate the end section 116 from the middle section 104, (3) separate the first knuckle 110 from the separated middle section 104, and (4) separate the second knuckle 112 from the separated middle section 104. According to an alternate embodiment of the present invention, two separate cuts (instead of four separate cuts) are made to the bird wing 102 to produce the uncooked food product 104'. Specifically, the bird wing 102, having the tip section 114 and the end section 116 attached to the first knuckle 110 and the second knuckle 112, respectively, is cut along the first cut line 118 (as described above) to separate the middle section 104 from the tip section 114 and the first knuckle 110. The bird wing 102 is also cut along the second cut line 120 (as described above) to separate the middle section 104 from the end section 116 and the second knuckle 112. The two cuts along the first and second cut lines 118 and 120 according to the alternate embodiment of the present invention may be made in any order or may be made simultaneously. The two cuts along the first and second cut lines 118 and 120 are preferably made using the cutting apparatus 202 shown in FIG. 2, but any suitable cutting instrument or instrumentality can be used, such as a meat cleaver, a meat knife, a hand saw, a power meat saw, a water knife, etc.

As is well-known, middle sections 104 of bird wings 102 are sometimes separated, packaged, and sold separately from the tip sections 114 and the end section 116 of the bird wings 102. In such instances, the first knuckle 110 and second knuckle 112 are always attached to the middle section 104 when the middle section 104 is packaged and sold. It will be appreciated by those skilled in the art that the method of the present invention as described above can be used to make the uncooked food product 104' from a middle section 104 which has been separated, packaged, and sold separately from the tip section 114 and the end section 116 of the bird wing 102, wherein the method in this particular case would be exactly as described above except that the step for cutting the bird wing 102 in order to separate the middle section 104 from the tip section 114 and the end section 116 would be unnecessary.

When the tip section 114, the end section 116, the first knuckle 110, and the second knuckle 112 are separated from the middle section 104 of the bird wing 102 to produce the uncooked food product 104', the skin necessarily remains on the uncooked food product 104'. However, depending upon the ultimate use which will be made of the uncooked food product 104', the skin may optionally be removed in a subsequent procedure (either before or after cooking) such by peeling or slicing of the skin (not illustrated).

From the foregoing description, it can be seen that the present invention comprises new and useful methods for butchering the wing of a bird for producing a food product which is easy to prepare and consume. The present methods are relatively quick, easy and reproducible to employ for butchering bird wings and the resulting food products represent more efficient, desirable, and profitable utilization of the available meat. It will be recognized by those skilled in the art that the present invention may be embodied in other specific forms without departing from the spirit or central attributes thereof, and, accordingly, reference should be made to the appended claims, rather than to the foregoing specification, as indicating the scope of the invention.

I claim:

1. A method of making a food product from a wing of a bird, the wing comprising a middle section having a first knuckle, a second knuckle spaced from the first knuckle, two bones spaced and generally parallel to each other and extending between and being connected to the first and second knuckles, and meat surrounding and attached to the two bones, the middle wing section also having an axis extending generally parallel to the two bones, the wing further comprising a tip section attached to the first knuckle and an end section attached to the second knuckle, the method comprising the steps of:

(a) cutting the wing to separate the middle section from the tip and end sections;

(b) cutting the separated middle section along a first cut line extending generally perpendicular to the axis, the first cut line being spaced from the first knuckle by a first predetermined distance, to remove the first knuckle from the separated middle section; and (c) cutting the separated middle section along a second cut line extending generally perpendicular to the axis, the second cut line being spaced from the second knuckle by a second predetermined distance, to remove the second knuckle from the separated middle section.

2. The method as recited in claim 1, wherein step (a) is performed before steps (b) and (c).

3. The method as recited in claim 2, wherein steps (b) and (c) are performed simultaneously.

4. The method as recited in claim 1, wherein steps (a), (b), and (c) are performed simultaneously.

5. The method as recited in claim 1, wherein the cuts along the first cut line and the second cut line are simultaneously made using two generally parallel cutting blades.

6. The method as recited in claim 1, wherein the first predetermined distance and the second predetermined distance are equal.

7. The method as recited in claim 6, wherein the first and second predetermined distances are equal to a value which spaces the first cut line slightly beyond the extremity of the first knuckle toward the second knuckle and which spaces the second cut line slightly beyond the extremity of the second knuckle toward the first knuckle.

8. A food product made in accordance with the method of claim 1.

9. The method as recited in claim 1, further comprising the step of cooking the food product resulting from performing steps (a)-(c), wherein the cooking step causes the meat surrounding and attached to the two bones in the middle wing section to shrink, thereby exposing end portions of the two bones.

10. A food product made in accordance with the method of claim 9.

11. A method of making a food product from a wing of a bird, the wing comprising a middle section having a first knuckle, a second knuckle spaced from the first knuckle, two bones spaced and generally parallel to each other and extending between and being connected to the first and second knuckles, and meat surrounding and attached to the two bones, the middle section also having an axis extending generally parallel to the two bones, the wing further comprising a tip section attached to the first knuckle and an end section attached to the second knuckle, the method comprising the steps of:

(a) cutting the wing to separate the middle section from the tip section and the first knuckle; and (b) cutting the wing to separate the middle section from the end section and the second knuckle.

12. The method as recited in claim 11, wherein steps (a) and (b) are performed simultaneously.

13. A food product made in accordance with the method of claim 11.

14. The method as recited in claim 11, further comprising the step of cooking the food product resulting from performing steps (a) and (b), wherein the cooking step causes the meat surrounding and attached to the two bones in the middle wing section to shrink, thereby exposing end portions of the two bones.

15. A food product made in accordance with the method of claim 14.

16. A method of making a food product from a partial wing of a bird, the partial wing comprising a first knuckle, a second knuckle spaced from the first knuckle, two bones spaced and generally parallel to each other and extending between and being connected to the first and second knuckles, and meat surrounding and attached to the two bones, the partial wing also having an axis extending generally parallel to the two bones, wherein the first knuckle is naturally attached to a tip wing section and the second knuckle is naturally attached to an end wing section, the tip and end wing sections having been separated from the first and second knuckles, respectively, to form the partial bird wing, the method comprising the steps of:

(a) cutting the partial wing to separate the partial wing from the first knuckle; and (b) cutting the partial wing to separate the partial wing from the second knuckle.

17. The method as recited in claim 16, wherein steps (a) and (b) are performed simultaneously.

18. A food product made in accordance with the method of claim 16.

19. The method as recited in claim 16, further comprising the step of cooking the food product resulting from performing steps (a) and (b), wherein the cooking step causes the meat surrounding and attached to the two bones in the partial bird wing to shrink, thereby exposing end portions of the two bones.

20. A food product made in accordance with the method of claim 19.

* * * * *